United States Patent Office 3,522,060
Patented July 28, 1970

3,522,060
PROCESS FOR PRESERVING PLANT MATERIAL
IN A FRESH STATE
Alfred K. Doi, 5654 S. Harper Ave.,
Chicago, Ill. 60637
No Drawing. Filed Apr. 17, 1967, Ser. No. 631,135
Int. Cl. A23b 7/00
U.S. Cl. 99—154                                                    6 Claims

ABSTRACT OF THE DISCLOSURE

Pulp temperature is alternated during processing after harvesting at a rate which inactivates respiratory enzymes and thereby precludes further endogenous deterioration.

---

This invention relates to a process for preserving perishable plant materials in a fresh state. Particularly the invention relates to a process for preserving perishable, edible and non-edible plant material (referred to hereinafter as "plant material of the described type") in a fresh state after harvesting or picking and the like by prohibiting endogenous degradation or deterioration.

All plant materials after separation (by harvesting, picking and the like) from the organisms of which said plant materials had theretofore normally been a part begin to deteriorate or degrade. Three generally unrelated degradation reactions are involved as follows: (1) plasmolysis or dehydration resulting from exosmosis of water; (2) exogenous deterioration or decay resulting from micro-biological activity involving micro-organisms such as bacteria, molds and yeasts, present outside of the bodies of the plant materials; and (3) endogenous deterioration or degradation. This invention does not concern the two former degradation reactions. They are readily controlled by various conventional procedures or techniques which may be employed in connection with treatment of plant material for controlling endogenous deterioration. The latter reaction heretofore has been most difficult to control and is for the most part responsible for short storage lives in plant material of the described class.

Endogenous deterioration usually results from respiration which normally occurs in plant tissue after it is separated from the organism of which said plant material had theretofore normally been a part. It is well established that such deterioration is brought about by an enzyme system which produces exothermic reactions in which plant sugars and other carbohydrates are converted to carbon dioxide and water, the latter being released into surrounding atmosphere.

Prior processes for controlling endogenous deterioration in plant material of the described type to preserve its fresh characteristics and enable its prolonged storage, propose steps which adjust the chemical composition of a storage atmosphere for the plant material with a view to slowing the rate of its endogenous degradation reaction. For example, in accordance with one prior process, plant material is oxygen-starved by reducing environmental oxygen below that normally found in air. Purportedly, plant respiration and accordingly plant deterioration are unable to proceed normally because of lack of oxygen to support the reaction at its normal rate. Also suggested for retarding endogenous degradation is a process in which environmental carbon dioxide is increased beyond that present in normal atmosphere. Purportedly, the excess carbon dioxide places a back pressure on the degradation reaction. Description of another process which purportedly controls endogenous deterioration implies that carbon dioxide must be removed from the storage atmosphere of plant material for prolonging its fresh characteristics.

Regardless of apparent similarity or antagonism between prior processes, rationales upon which they are hypothecated are in agreement that at best endogenous deterioration is not stopped by prior processes, only retarded. Proponents of various prior processes suggest that it is undesirable to entirely prohibit the chemical reaction of endogenous deterioration because plant material in which that occurred would die. However, in accordance with the rationale of the present invention, it is inconsequential whether plant material is alive or dead so long as it does not deteriorate from a fresh state in which it is desired to maintain such plant material.

Accompanying the present invention was the retalization that no endogenous degradation in plant material can occur without an enzyme system. Consequently, endogenous degradation can be stopped if the enzyme system required therefor is inactivated.

Accordingly, it is an object of the present invention to provide an improved process for treatment of perishable plant material for retaining its fresh characteristics.

It is another object of the invention to provide an improved process for controlling endogenous deterioration in plant material and thereby enabling prolonged storage.

It is a further object of the invention to provide an improved process for controlling a respiratory enzyme system in plant material to retain therein a fresh character during and after prolonged storage.

It is an additional object of the invention to inactivate a respiratory enzyme system in plant material to prohibit endogeneous deterioration.

As a feature of the present invention, plant materials, which are subject to endogenous deterioration of the type which regularly accompanies respiration in such plant material following separation (by harvesting, picking and the like) from an organism of which said plant material normally theretofore was a part, are treated to condition a respiratory enzyme system to an inactive state and thereby prohibit endogeous degradation. Conditioning according to the exemplified process includes alternating the temperature of the enzyme system at a rate which causes it and at least one enzyme thereof to become disabled and ineffective.

As a consequence of the invention, edible and inedible plant materials may be effectively processed to preserve their characteristiccs during and after storage for greater periods of time than has been possible heretofore.

The foregoing and other objects, features and advantages of the invention will become more apparent upon consideration of the following description and appended claims.

Prior to treatment of plant material, in accordance with the present invention, it is preferable that the plant material be in a condition of near freshness or near full ripeness so that by the time its respiratory enzyme system is inactivated it will have reached a state of peak freshness or full ripeness. This factor can be controlled in several ways which will be evident to those knowledgeable in the art. A preferred way is by selecting a harvesting or picking time which will provide a desired condition after completion of processing.

Plant materials for which the presently disclosed process is especially adapted are those in which endogenous deterioration results during normal respiration particularly involving enzyme-produced reactions for oxidation of sugars and carbohydrates. While various nuts and gourds and gourd-related plants are not particularly adapted for the present process, pulpy fruits, such as apples, and vegetables, such as radishes and cauliflower, and cut flowers are particularly suited for preserving treatment in accordance with the present process.

In accordance with the present process, plant material of selected freshness is initially chilled prior to placing into a conditioning or processing room where the temperature is to be adjustably controlled. The initial quick chilling is calculated to minimize taxing apparatus by which environmental temperature is controlled in the processing room. Hydrocooling is preferred for initial quick chilling of certain plant materials because that method is most efficient and economical. However, other initial chilling methods may be used if hydrocooling is contra-indicated. Preferably after initial quick chilling, the pulp temperature of the plant material being treated is at the low level of the temperature range within which ensuing treatment or processing will occur.

Thereafter, the plant material is arranged in the processing room which, according to preferred practice, is equipped with control means for holding the temperature within treatment range. The arrangement of the plant material should be calculated to permit circulation within the processing room to preclude a significant temperature variation between various parts of the load at a given time. This consideration is of importance if treatment temperatures approach freezing because of the hazard of freezing parts of the load while attempting to attain required low temperatures in other parts of the load.

The exemplary processing room is also equipped and conditioned with conventional humidity responsive controls and moisture supplying apparatus to obviate plasmolysis. Moreover, to preclude exogenous deterioration of the plant material, a suitable inert atmosphere may be provided in the processing room. That is to say, the normal atmosphere is replaced by a gas, such as nitrogen, which is incompatible with aerobic micro-organisms. When nitrogen is used to provide the inert environment, is may be introduced through conduits to the processing room as a space chilling vapor from a liquid nitrogen supply source in a manner such that the processing room temperature is, with the aid of additional suitable refrigerating equipment, reduced as quickly as possible to about the low point of the temperature range of the ensuing treatment.

When the low level of the temperature range has been reached, active cooling of the storage room is stopped. As a result, the temperature of the pulp of the plant material will spontaneously rise because of evolution of heat as the plant material respires. Rise in pulp temperature will be accompanied by a rise in the temperature of the atmosphere of the processing room.

Suitable heat sensor means is engaged in or near a portion of the pulp of the plant material which may be the last to rise and fall to the upper and the lower limits of the temperature range of the process. The sensor means is coupled to conventional controls of the refrigeration means with which the processing room is equipped so that when the appropriately sensed pulp reaches the upper limit of the temperature range for the conditioning treatment, the room refrigeration equipment will be activated. It is appreciated that the refrigeration equipment has a capacity adequate to reduce the temperature of the pulp in accordance with the requirements of the present process, and accordingly upon activation reduces processing room temperature and consequently pulp temperature of the plant material to the lower limit of the processing range. The lower limit temperature when sensed by the heat sensor means causes the refrigeration equipment to switch to an inactive or ineffective state in which the pulp temperature again is free to rise.

From the foregoing, it is appreciated that while the plant material is capable of spontaneous heat production its pulp temperature will be cyclically automatically alternated. However, the length of the successive cycles will increase until temperature alternation ceases. At such time the pulp temperature will not rise above the lower limit of the temperature range of the process. All respiration of the plant material has then ceased because the respiratory enzyme system of the plant material and at least one enzyme thereof have become inactivated. As a result, no further endogenous oxidation reactions can occur.

As yet, it has not been determined whether artifically warming the pulp of the plant material immediately after it is apparent that the automatic temperature cycling has ceased will reactivate the enzyme system. However, if pulp temperature is retained at the low level of the process temperature range for at least 10 hours after cessation of the automatic cycling, the enzyme system seems to be incapable of reactivation to an effective state, and thereafter endogenous deterioration does not occur. Although the plant material may be considered dead at this latter time because respiration has ceased, it will retain its fresh characteristics as the enzyme system responsible for degradation has been inactivated.

Neither the precise limits of the alternating temperature range nor the limits of the frequency of the alternations has as yet been determined. It may well be that either or both will vary according to the genus, species or class of plant material. It is determined, however, that the enzyme system of plant material which has been processed according to the invention is inactivated by alternating temperature in a range of about 8°–10° F., with the lower limit of the range being about the highest freezing point of the plant material processed with the initial temperature alternating cycle being completed in about one hour.

Radishes processed according to the present invention have been stored in a fresh state for several months. Respectable authority sets storage life of radishes treated according to heretofore known processes at about 10 days. Cauliflower, when processed conventionally, has a maximum storage life of about 3 weeks. Cauliflower processed according to the present invention about 3 months ago is presently in storage in a fresh state.

The invention presently is being and heretofore has been practiced according to the following:

EXAMPLE I

Topped radishes, in an optimal fresh state and in a form in which each radish is separated from the others, are loaded to fill a bushel-type container fashioned to maximize environmental gas circulation through the contained radishes. Said container has a capacity of 2.4 cubic feet and holds 40 pounds of radishes. The container with said radishes is conveyed through a bath of running water held at or near its freezing temperature. The hydrocooling is calculated to reduce the pulp temperature of the radishes to about the temperature of water and requires several minutes. Thusly conditioned, the radishes are ready for treatment or processing according to the invention in a processing room.

If, however, immediately prior to being placed in a processing room the pulp temperature of the radishes has risen more than 5° F., the radishes preferably are re-immersed in the water bath to re-cool the pulps of the radishes.

With the radishes thusly packed and cooled, the container with radishes is placed in a leak-proof refrigerated storage room. The room employed in the present example is a top loading type refrigerated box with inside dimensions of 35" x 35" x 35". A wooden slated platform 6" high spaces the container from the bottom of the refrigerated box. A circulating fan placed in the space below the bottom platform assures circulation of refrigerated atmosphere throughout the box. Three-inch spacer walls which line the sides of the box prevent the container from touching the metal walls of the refrigerated box and thereby preclude freezing of the radishes. A humidifying apparatus connected to the box maintains the relative water content of the atmosphere in the box at about 90% to 95% during processing and storage thereafter.

Nitrogen gas from a pressurized container is administered into the refrigerated box. Control on the flow of nitrogen is arranged in a manner calculated to provide a total nitrogen environment in the processing box, except for oxygen, the latter being present in a diminishing amount over the course of the process in a range of 10% to 1% of the total atmosphere within said box. The oxygen of course is required for supporting respiration while the enzyme system is being inactivated. An evacuating pump may be connected to the box to aid influshing former atmosphere at initiation of the process in the box. In larger production processing, liquid nitrogen may be sprayed into the processing room at the initiation of the process. In addition to providing the required nitrogen atmosphere, such procedure also lowers the temperature of said room.

Prior to introduction of nitrogen into the refrigerated box, a heat sensor is introduced into the pulp of, or placed adjacent a radish at the center of the load. The character of the sensor is such that when the temperature sensed falls to about 30.7° F. (the highest freezing point of radishes), an electrical control circuit, to which said sensor is coupled and operating the refrigeration equipment, will become continued to inactive the refrigeration equipment, and then the temperature sensed rises to about 38.7° F., the electrical circuit will become conditioned to activate the refrigeration equipment.

Once sensor has been set in its selected position, the processing room is closed off and a start switch is operated to start the various processing systems. Nitrogen flows into the storage space and the sensor becomes active to control the operation of the refrigeration equipment.

Heat generated by radishes each time the refrigeration equipment is in an inactive state aids in elevating the temperature adjacent the sensor to 38.7° F. and thereby causes automatic cycling of the temperature between about 30.7° F. and 38.7° F. After the radishes have been under process conditions for between 90 and 96 hours, no treatment in or out of storage will cause the radishes to respire. During the process the initial temperature alternating cycle requires about an hour. However, as the process progresses, the cycles become longer.

After the radishes are incapable of further respiration, they are packaged to minimize exogenous destruction. According to one method which is satisfactory, the treated radishes are placed in 6 oz. polyethylene bags which are nitrogen flushed and sealed. Thirty bags are packed in a carton which is overwrapped with polyvinylchloride film. The overwrap is then shrunk on the carton in a conventional manner. Thereafter, each carton is placed in a freeze blast tunnel for 4 to 5 minutes to remove heat of packaging and reduce the temperature of the contents of the carton to about 34° F. at about which temperature the cartons are then stored.

EXAMPLE II

Twenty heads of cauliflower, after being subjected to vacuum cooling to a pulp temperature of 34° F., were placed in a bushel basket and placed in said refrigerated box.

After 90 hours of treatment in the refrigerated box in the manner described in Example I for treatment of radishes, the pulp temperature of the cauliflower stabilized for over two hours and there was no emission of carbon dioxide.

These cauliflower were then individually packaged in polyethylene bags flushed with a nitrogen atmosphere and then packaged in a corrugated carton. The carton was overwrapped with polyvinylchloride film which was heat shrunk on the carton.

Thereafter, the carton was quick-cooled to about 34° F. and then stored at that temperature.

As many substitutions or changes could be made in the above described process, and as many apparently widely different embodiments of the invention within the scope of the claims could be constructed without departing from the scope and spirit thereof, it is intended that all matter contained in the accompanying specification shall be interpreted as being illustrative and not in a limiting sense.

The embodiments of the invention in which an exclusive property or privilege is claimed are defined as follows:

1. A process for preserving in a fresh state solid pulpy plant material including radishes, cauliflower, and the like by deterring endogenous deterioration and comprising the steps of alternating the temperature of the pulp of said plant material in a plurality of cycles characterized by:

lowering the temperature of the pulp of the plant material after harvesting to about the freezing point of water;

interrupting the temperature lowering step and permitting the pulp temperature to rise spontaneously and to a level several degrees above said freezing temperature;

then thereupon repeating said temperature lowering and spontaneous heating steps until an enzyme of a respiratory enzyme system is disabled.

2. A process according to claim 1 in which each cycle occurs in a temperature range the low point of which precludes freezing said plant material.

3. A process according to claim 1 in which the temperature range of the cycles is between a low point of less than the freezing point of water and a high point of about 39° F.

4. A process according to claim 1 in which the spontaneous heat generated by the pulp while said ennzyme is being disabled is permitted to elevate the temperature of the pulp to a level not exceeding about 39° F.

5. A process according to claim 3 in which successive temperature cycles are of increasing length and the temperature lowering phase of each cycle is initiated responsively to a pulp temperature about 39° F. and resulting from spontaneous heating.

6. A process according to claim 1 characterized by the further step of hydrocooling the plant material befor beginning temperature cycling.

References Cited

UNITED STATES PATENTS

| 2,474,650 | 6/1949 | Birdseye | 99—221 |
| 2,901,356 | 8/1959 | Gallotti | 99—155 |
| 3,269,133 | 1/1968 | Dixon | 99—150 |
| 3,365,307 | 8/1966 | Dixon | 99—150 |

LIONEL M. SHAPIRO, Primary Examiner

R. B. ANDEWELT, Assistant Examiner

U.S. Cl. X.R.

99—150, 192, 193